United States Patent [19]
Blumenthal

[11] Patent Number: 4,605,293
[45] Date of Patent: Aug. 12, 1986

[54] SPECTACLE FRAME WITH RESILIENT HINGES

[76] Inventor: Oreste Blumenthal, Corso Montevecchio 36, Torino, Italy

[21] Appl. No.: 582,787

[22] Filed: Feb. 23, 1984

[30] Foreign Application Priority Data

Mar. 3, 1983 [IT] Italy ............... 67243 A/83

[51] Int. Cl.⁴ .................... G02C 5/14; G02C 5/22
[52] U.S. Cl. ............................... 351/153; 351/121
[58] Field of Search ............... 351/121, 153, 113; 16/228

[56] References Cited

U.S. PATENT DOCUMENTS

| | | | |
|---|---|---|---|
| 3,064,530 | 11/1962 | Vigano | 351/121 |
| 3,644,023 | 2/1972 | Villani | 351/121 X |
| 3,837,735 | 9/1974 | Guillet | 351/153 |

*Primary Examiner*—Rodney B. Bovernick
*Attorney, Agent, or Firm*—Morgan, Finnegan, Pine, Foley & Lee

[57] ABSTRACT

A spectacle frame having two interconnected parts (for example, the front and one of the side pieces or the two portions of the bridge of the front or the two portions of one of the side pieces in the case of a foldable frame) which are pivotable relative to each other between a folded, mutually closed position and a mutually open position by means of a resilient hinge mechanism including a rolling body cooperating under the action of resilient biassing means associated with one of the parts of the frame, with a cam member associated with the other part of the frame to allow limited and definable sprung angular displacements of the two parts of the frame with respect to a stable mutually open position. The resilient biassing means include at least one flexion spring anchored to the respective part of the frame and defining a seat for the lateral containment and centering of the rolling member.

26 Claims, 17 Drawing Figures

SPECTACLE FRAME WITH RESILIENT HINGES

The present invention relates generally to spectacle frames having foldable parts connected together by means of resilient hinges. Such foldable parts may be constituted by the side pieces and the front of the frame or, in the case of foldable frames, by two articulated portions of the front, or again by two articulated portions of each side piece.

By the term "resilient hinge" is generally meant an articulation device able to achieve a resilient reaction which opposes the mutual opening rotation of the two parts of the frame, or which assists the closing rotation and which determines a stable open position relative to which the parts of the frame can effect limited relative angular displacements against the said resilient reaction. These limited angular displacements may consist of a further opening of the two parts of the frame and/or of the first part of their closing movement.

The use of resilient hinges, particularly for the articulation of the side pieces to the front of the frame, improves the functional efficiency and the convenience of the spectacles in use, making them easier for the user to put on, even with one hand, and at the same time making them more comfortable and stable and more easily adaptable to different conformations of the crania of the users.

In a known frame of the type defined above, described and illustrated in Italian Pat. No. 759,650 dated Feb. 10th, 1966, the hinge sockets or eyelets of one of the two articulated parts of the frame (side piece) are formed directly on a slider slidable under the action of a helical compression spring. The hinge sockets or eyelets of the other articulated part of the frame (outer side of the front) are shaped with a frontal cam profile which, cooperating with the end of the side piece facing it, produces the desired resilient reaction. The friction which is developed between the zones of contact of the two articulated parts is thus of the sliding type which involves serious disadvantages due essentially to the operational wear, which causes premature loss of stability and functionality of the frame.

Among other things there have also been proposed, in Italian Pat. No. 511547 dated 3. 13. 1954, in Italian Patent Application No. 11864-A/69 dated Jan. 22, 1969, in Italian Utility Models Nos. 134,731 and 134,732 dated Jan. 22, 1969, No. 161,398 dated May 30, 1973 and in Italian Pat. No. 995,606 dated Oct. 4, 1973, resilient hinges shaped so as to replace the sliding friction by rolling friction. According to these solutions the mechanism consists of a cylindrical helical spring inserted in an axial seat in the side piece and on which a ball bears. The hinge sockets or eyelets of the front have a cam profile cooperating with the ball which is thrust into rolling contact therewith by the action of the compression spring. Thus rotational friction is created between the two articulated parts and, forces being equal, should in theory be considerably less than the sliding friction of the solution previously described.

In practice the friction which is developed between the balls and the cam profiles is considerable even in these mechanisms and it has been found that this is due in practice to the fact that during relative movement between the two articulated parts, the movement of the ball is not purely rolling but also sliding, whereby the friction which is developed is of a mixed type.

For this reason modifications of this mechanism have been proposed, for example in Swiss Pat. No. 622,623 dated May 30, 1978, in which an intermediate rolling member (normally an auxiliary ball) is interposed between the ball and the compression spring.

This solution, like the preceding one, has not provided satisfactory results in that the operating wear is still very high, with consequent loss of stability and functionality of the frame with time.

Moreover all the mechanisms described above are made in practice with working tolerances which give rise to small but not inconsiderable play between the various components. Consequently, even if the cam surfaces against which the resilient return force is applied are regular, the force which is developed in practice immediately around the equilibrium positions of these cam profiles may be relatively low and may increase suddenly to predetermined values from these positions. This irregular functioning generates very serious functional anomalies in that when the spectacles are put on the correct relative position between the front and the side pieces may be unstable and hence indefinite, since the forces exerted in putting on the spectacles and the frictional forces which are developed between the frame and the head of the user may exceed the resilient return capacity of the side pieces.

A further disadvantage which arises with the mechanisms described above is that the front is difficult to centre relative to the axes of sight of the user's eyes, creating difficulties in vision of the spectacle wearer. Incorrect centering of the front may in fact occur easily because of the internal play of the mechanism and the friction within the mechanism and outside it (between the side pieces and the head of the user) and because the reaction of the springs is insufficient. This means in practice that the spectacles have corrective lenses completely out of line with the optical axes of the user, which is obviously unacceptable.

The object of the present invention is to avoid the disadvantages mentioned above by providing a frame of the type defined above with resilient hinges the mechanisms of which are as free as possible from play and adapted to be effective over a long period of time.

In order to achieve this object, the present invention provides a spectacle frame of the type defined above, that is, having two parts connected so as to be pivotable relative to each other between a mutually closed folded position and a mutually open position, by means of a resilient hinge mechanism including a rolling member cooperating, under the action of resilient biasing means associated with one of the frame parts, with a cam member associated with the other of the parts of the frame and defining a stable open position relative to which the two parts in the mutually open position are able to effect limited and definable relative angular displacements against the action of said resilient biasing means, the main characteristic of which lies in the fact that the resilient biasing means include a flexion spring device anchored to the respective part of the frame and defining a seat for laterally containing and centering the rolling member.

The action of containing the rolling member by the flexion spring device, combined with a geometry which ensures resilient self-centering of the rolling member ensures continuous and correct contact between the various components of the hinge mechanism without there being zones in which the resilient reactions are influenced by the practical manufacture of the components.

This solution thus allows any play to be effectively eliminated, the rolling member being kept centered and the resilient reaction being perfectly controlled and determined by the flexion spring resilient device.

Another important advantage of the invention over known solutions described above lies in the fact that, for a given profile of the cam member, the reaction force of the resilient device increases much more rapidly, as the stable open position is departed from. This results from the different reaction characteristics of flexion springs compared with helical compression springs: in fact in the latter the reaction force is linearly proportional to the compression undergone, while in the case of a flexion spring the reaction force is greater and is in any case a function of the free projection of the spring itself.

By definition the invention is able to ensure correct and stable relative positioning of the two articulated parts of the frame, both in the normal open position and in the extra-open resilient position, which is particularly important when the parts in question of the frame are constituted by the side pieces and the front, since in this case stable positioning and centering of the front relative to the optical axes of the user is obtained.

The flexion spring device may be formed in various ways and naturally with different shapes materials. In general, the flexion spring device is constituted by at least one and preferably two leaf spring arms projecting from the respective part of the frame. These spring arms may be of the laminar or wire type and are normally located so as to act on opposite sides of the rolling member, defining the said lateral containment and centering seat thereof.

According to a preferred embodiment of the invention, the two flexion springs are located in a Y-configuration the stem of which is anchored to a respective part of the frame and the resilient opposing arms of which open towards the said cam member.

According to a further characteristic of the invention, adjusting means are provided for varying the load of the or each flexure spring by means of a variation of the degree of their free projection or the thrust of these springs against the rolling member.

The rolling member is preferably a cylindrical roller since this form ensures the greatest bearing area and hence the least wear of the surface of the cam member.

Alternatively the rolling member may be spherical, ovaloidal or ellipsoidal.

In each case in the frame according to the invention the resilient hinges may be formed with very small dimensions which is a very important advantage for a product such as spectacles in which the aesthetic factor and lightness have an increasingly significant role. Such resilient hinges are constituted by a small number of components which are easy to manufacture and assemble, which contributes to limiting the production costs of the frame.

Further characteristics and advantages of the invention will become evident from the detailed description which follows, with reference to the appended drawings, provided purely by way of non-limiting example, in which.

Figure 1:
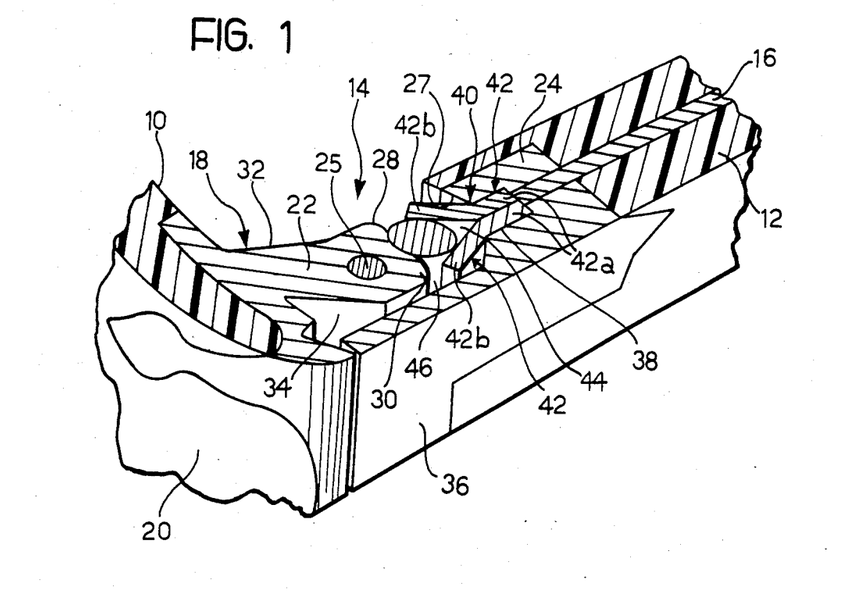
FIG. 1 is a sectioned perspective view of a spectacle frame provided with a resilient hinge according to the invention.

FIG. 1 illustrates part of a spectacle frame, in particular the zone of articulation between the front 10 and one of the side pieces 12 of the frame by means of a resilient hinge mechanism generally indicated 14.

In the example illustrated the frame is of plastics material, for example celluloid, acetate or the like, but it will be understood it could be of metal or any other material. In the example, the side piece 12 incorporates in known manner a reinforcement core 16 constituted by a central metal wire or strip extending longitudinally.

Each resilient hinge mechanism 14 includes a metal element 18 rigidly fixed to an upper laterally projecting part 20 of the front 10 and forming a hinge socket or female member 22 and a metal body 24 fixed to the end of the side piece 12 and defining a pair of sockets or female members, not illustrated, which are pivotally connected to the female member 22 by means of a hinge pin 25. The female member 22 has a frontal cam profile which, as is best seen in FIGS. 3 to 8, has a curved shape defining a depression 26 bounded by two shoulders, an inner one 28 and an outer one 30, the first of which adjoins an inner concave side 32 and the second an outer inclined side 34. Naturally the cam profile could be different from that illustrated in the example, in particular with regard to the shape of the sides 32 and 34.

The metal body 24 fixed to the side piece 12 includes a lateral outer blade appendage constituting a stop member 36 arranged to cooperate in the manner clarified below, with the outer inclined side 34 of the female member 22. The body 24 forms a box 27 at its front end the front wall of which is formed with a frontal recess 38 disposed on the elongation of the core 16 in which is anchored a resilient biassing member generally indicated 40.

Figure 9:
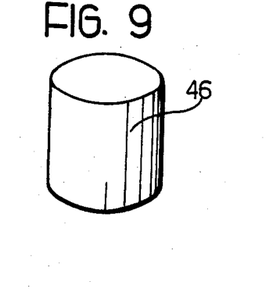
FIG. 9 is a perspective view of a detail of the hinge.

According to the invention, the resilient biassing member 40 is constituted by a flexion spring device which, in the example of FIG. 1, is formed by a pair of metal blades 42 arranged in a Y-configuration. The two blades 42 have respective mating root parts 42a engaged in the recess 38 and leaf spring arms 42b inclined at an obtuse angle to the respective root parts 42a and projecting and diverging towards the socket 22. The free ends of the spring arms 42b are spaced from the socket 22 and define a lateral containment and centering seat 44 in which a rolling member 46 is inserted and pressed resilient by the action of the spring arms 42b against the cam surface of the socket or female member 22. In the example of FIG. 1, the rolling member 46 is constituted by a cylindrical roller, illustrated in greater detail in FIG. 9, having its axis arranged parallel to the axis of the hinge pin 25. This roller 46 is preferably of metal but could be formed of any other suitable material.

Figure 5:
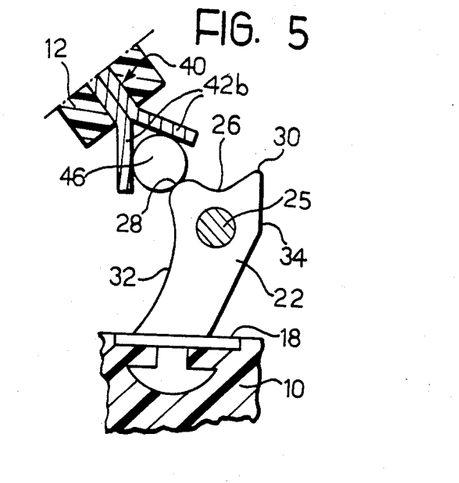
Figure 6:
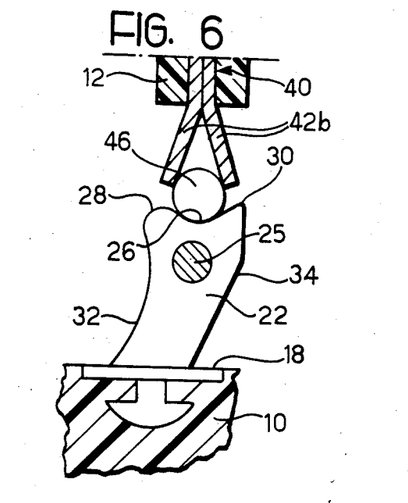
Figure 7:
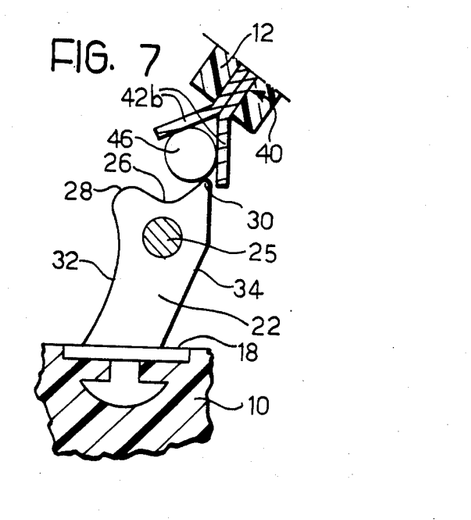

The resilient hinge mechanism 14 described above allows the side piece 12 to effect the necessary opening and closing rotations relative to the front 10, allowing the possibility of limited and definable resilient angular displacements in opposite directions from a stable open position, illustrated in FIGS. 1 and 6, in which the side piece 12 and the front 10 are essentially perpendicular to each other. It will be clear that starting from the closed position of the side piece 12, in which it is folded parallel to the front 10 (FIG. 4) the angular movement of the side piece itself towards the open position causes rolling of the roller 46 along the inner concave side 32 of the socket or female member 22. At the free end of the side 32, the roller 46 encounters the inner shoulder 28, and passes over it as a result of the resilient divergence of the arms 42b of the flexion spring 40 (FIG. 5). Upon the sprung return of the arms 42b, the roller 46 is subsequently engaged in the frontal depression 26, thus achieving a snap-movement of the side piece 12, which is retained resiliently in the stable open position (FIG. 6). From this position, the side piece 12 is able to effect angular movements respectively towards the inner shoulder 28 and towards the outer shoulder 30 (FIGS. 5 and 7) against the action of the spring 40 which, as a result of the deformation of the spring arms 42b, tends to return it to the stable normal open position. If the angular displacement is in the sense of closing the side piece 12, immediately the roller 46 has passed beyond the shoulder 28, the side piece 12 is snap-closed against the front 10 as a result of the resilient reaction of the spring 40. If, however, the angular movement is in the opposite that is, the opening sense, the roller 46 is able to roll to its maximum extent close to the apex of the outer shoulder 30, after which the movement of the side piece 12 is blocked as a result of the bearing of the lateral stop member 36 against the outer inclined side 34 of the female member 22. If the side piece 12 is left in this position, the reaction of the spring 40 returns to it to the stable open position in which the roller 46 engages in the depression 26.

The blocking of the resilient opening movement of the side piece 12 may be achieved in a different manner from that described above, for example by forming a recess in the element 18 (FIG. 1) or directly in the material of the front 10 (FIG. 2) which latter defines an inclined face 66 limited by a stop portion 68 arranged to cooperate with the free end of the stop member 36. This solution has the advantage that, in the stable open position of the side piece 12, the free end of the stop member 36 is disposed immediately adjacent the corresponding part of the front 10 practically without any gap between their outer surfaces, which enables an agreeable aesthetic apperance to be achieved.

A further method of obtaining the blocking of the resilient opening movement of the side piece 12 could consist in shaping the side wall of the box 27 facing the outer spring arm 42b so as to prevent the resilient deformation of the latter beyond a predetermined limit corresponding to the maximum desired angular movement of the side piece 12.

The particular shape of the resilient hinge mechanism 14 and particularly of the resilient member 40 is able to ensure the continuous and correct contact between the various components of the device, practically eliminating any play and reducing internal friction to a minimum. This leads to a greater stability and working life of the frame and to a positioning of the front which is always correct, that is, with the lenses fitted therein having their axes exactly on the optical axes of the user during use of the frame.

Naturally the conformation of the resilient hinge mechanism 14 can be modified and varied in a multiplicity of ways of which several will be described below.

Figure 2:
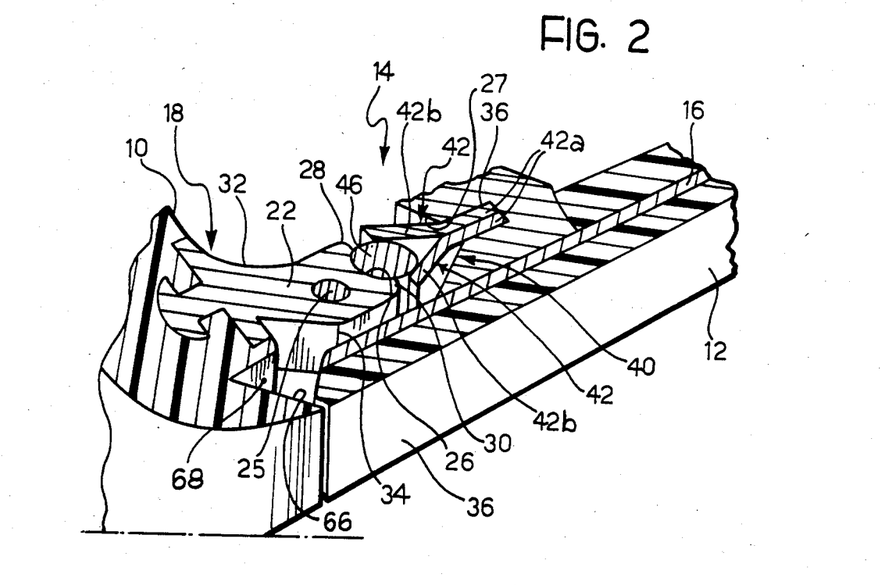
FIG. 2 is a variant of FIG. 1.
Figure 3:
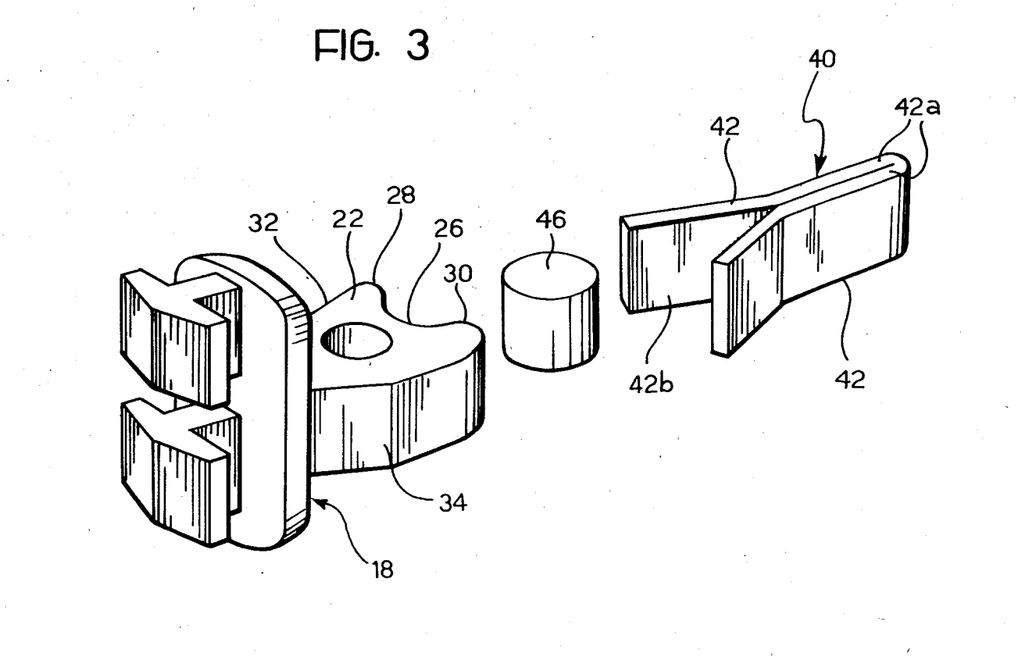
FIG. 3 is an exploded perspective view of part of the hinge.
Figure 4:
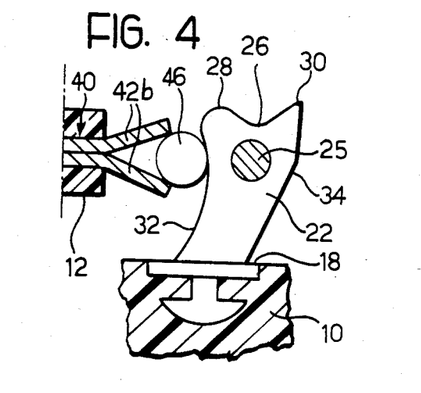
FIGS. 4 to 7 are four plan views from above illustrating schematically the hinge of FIG. 1 or of FIG. 2 during operation.

The variant of FIG. 2 is generally similar to the embodiment illustrated in FIG. 1 and only the differences will be described in detail, the same reference numerals being used for identical or similar parts. According to this variant the recess 38 for the roots 42a of the blades 42 is offset laterally relative to the core 16 of the side piece 12, towards the inner side of this side piece 12.

In this case the metal element 18 applied to the projecting part 20 has a part for attachment to the front 10 which has a different shape from that used in FIG. 1.

The anchoring of the flexion spring 40 to the metal body 24 may be achieved, as in the preceding case, in a fixed manner, for example by welding, brazing, rivetting, or by screws or equivalent systems or in a slidable manner in order to allow the spring-loading to be varied in dependence on the requirements of use. An example of a possible adjustment system is illuatrated in the variant of FIG. 8, in which the root parts 42a of the blades 42 are slidably inserted in the recess 38. An adjusting grub screw 48 screwed into a screw threaded hole 50 in the metal body 24 bears against the free ends of the roots 42a and obviously allows a variation in the free projection of the spring arms 42b, consequently modifying their resilient reaction. A lateral grub screw 52 screwed into a lateral hole 54 in the body 24 allows the clamping of the spring 40 in the pre-selected adjusted position.

A further possible adjustment system could consist, instead of a variation in the free projection of the spring arms 42b, in a modification of the thrust of the entire spring 40 against the rolling member 46, for example by means of a screw similar to the screw 48, which allows the adjustment of the degree of divergence of the spring arms 42b. The characteristics of resilience of the spring 40 can also be modified by means of various devices, for example through suitable shaping of the cam profile of the socket or female member 22 or by appropriate geometry of the walls of the metal body 24.

FIGS. 12 to 17 illustrate various possibilities for variants of the flexion spring 40.

Figures 8, 12, 13:
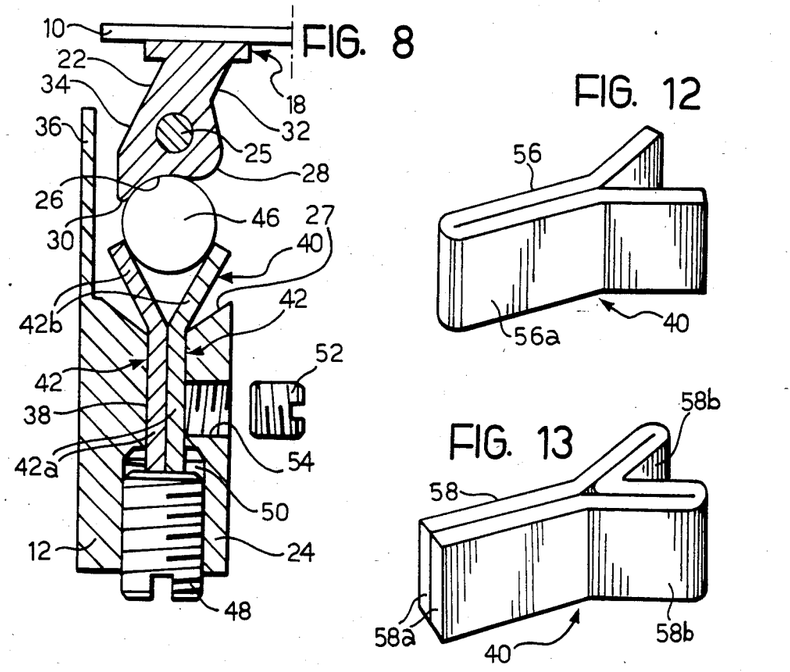
FIG. 8 is a view similar to FIGS. 4 to 7 illustrating an example of adjustment of the loading of the resilient device of the hinge.
FIG. 12 is a perspective view of a variant of another detail of the resilient hinge.
FIGS. 13 to 17 show five variants of FIG. 12.

In the case of FIG. 12, the flexion spring 40 is formed from a single Y-shaped blade 56 with the relative root parts 56a formed by two folded mating arms of a blade 56, instead of by two separate blades 42.

In the case of FIG. 13, the spring 40 is also formed from a single bent blade 58 but in this case the bending is achieved in correspondence with the sprung arms 58b while the root parts 58a are formed by the mating ends of the blade 58.

In the case of FIG. 14, the spring 40 is again formed by a one-piece blade 60 having a bifurcated end which defines the two spring arms.

In all the embodiments described above, the spring 40 has a flat blade configuration. It could, however, be constituted by a simple wire shaped in a form corresponding to those mentioned above, as in the case of FIG. 16, or by a pair of wires joined in a Y-configuration as in the case of FIG. 15. These configurations in practice define contact surfaces with the rolling member 46 having a rounded form with the advantage of ensuring friction which is undoubtedly less than that which is produced between the rolling member 46 and the cam profile of the socket or female member 22, thus ensuring the correct rolling.

Figure 10:
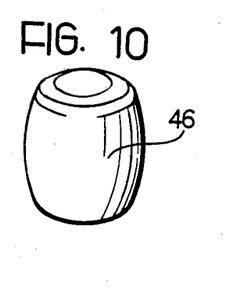
FIGS. 10 and 11 illustrate two variants of FIG. 9.
Figure 11:
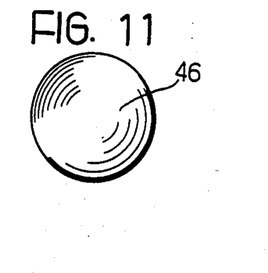
Figure 14:
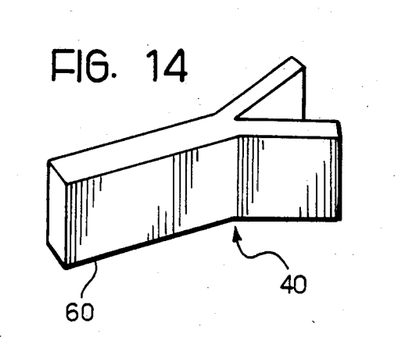
Figure 15:
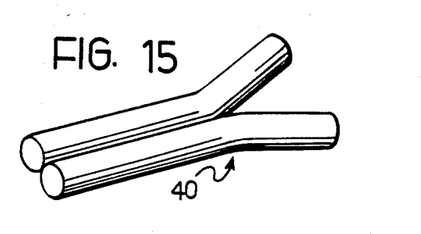
Figure 16:
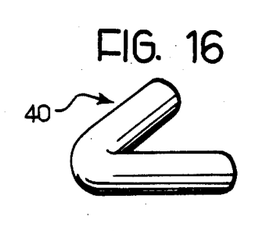
Figure 17:
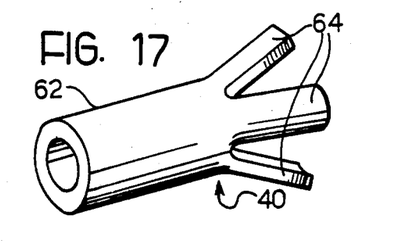

A further possible configuration of the flexion spring 40 is illustrated in FIG. 17 and consists in the use of a small tube 62 having an array of sprung lugs 64 at one end, these being located on a conical surface and defining the seat for containing and centering the rolling member 46. In this case, as in the embodiments of the flexure spring 40 previously described, the rolling member 46 may take on different forms from that of a cylindrical roller, and may for example be constituted by a barrel roller (FIG. 10), a sphere (FIG. 11) or a body of ovaloidal or ellipsoidal form.

Obviously the various components of the resilient hinge 14 and particularly of the flexion spring 40 and the rolling member 46 may be very different, for example of metal, plastics or other material, which allow the desired operation.

It should be noted that, although the invention has been described with reference to the articulation between one of the side pieces 12 and the front 10 of the frame, it could also be applied to other articulated parts of the frame with equal advantage. In particular, by virtue of the very small dimensions of its components, the hinge 14 may be used in foldable frames both for connecting the two jointed portions of the bridge interconnecting the lens holders, and for connecting the initial and terminal portions of the foldable side pieces.

The use of the resilient hinge described above is obviously not limited to frames of plastics material but may extend, with equal advantage, to frames of different materials, for example metal, for which the small dimensions of the hinge mechanism are particularly useful from the aesthetic and functional points of view.

It should be noted that in any application of the resilient hinge mechanism 14 to the frame, the general configuration of the flexion spring 40 could be varied widely with respect to that described and illustrated without thereby departing from the scope of the present invention. In particular, this configuration could be limited to a single leaf spring arm projecting from the respective support part of the frame and disposed so as to achieve solely the snap closure or the resilient extra-opening of this part relative to the part of the frame articulated thereto. Naturally in this case the support body of the spring arm would be shaped so as to define, together with the spring arm, the seat 44 for containing and centering the rolling member 46.

It should finally be noted that the arms 42b of the spring 40 could be replaced by substantially rigid blades made resilient by added resilient support or bearing elements inserted in the housing 27 and constituted, for example, by pads of elastomeric or like material

I claim:

1. Spectacle frame having two parts interconnected so as to be pivotable relative to each other between a mutually closed folded position and a mutually open position, a resilient hinge mechanism pivotally interconnecting the parts and including resilient biassing means associated with one of the frame parts, a cam member associated with the other of the frame parts, and a rolling member cooperating with the cam member under the action of the resilient biassing means, the hinge mechanism defining a stable open position relative to which the two parts are able to effect limited and definable relative angular displacements against the action of the said resilient biassing means, wherein the resilient biassing means include a Y-configuration flexion spring device comprised of leaf spring means, said flexion device anchored to the respective part of the frame and defining a resiliently deformable seat for the lateral containment and centering of the rolling member.

2. Spectacle frame having two parts interconnected so as to be pivotable relative to each other between a mutually closed folded position and a mutually open position, a resilient hinge mechanism pivotally interconnecting the parts and including resilient biassing means associated with one of the frame parts, a cam member associated with the other of the frame parts, and a rolling member cooperating with the cam member under the action of the resilient biassing means, the hinge mechanism defining a stable open position relative to which the two parts are able to effect limited and definable relative angular displacements against the action of the said resilient biassing means, wherein the resilient biassing means include a Y-configuration flexion spring device anchored to the respective part of the frame and defining a seat for the lateral containment and centering of the rolling member, the flexion spring device including at least one leaf spring arm projecting from the relative part of the frame.

3. Frame as defined in claim 2, wherein said at least one spring arm is formed by a flat blade.

4. Frame as defined in claim 2, wherein said at least one spring arm is formed by a body of rotation with a convex surface.

5. Spectacle frame having two parts interconnected so as to be pivotable relative to each other between a mutually closed folded position and a mutually open position, a resilient hinge mechanism pivotally interconnecting the parts and including resilient biassing means associated with one of the frame parts, a cam member associated with the other of the frame parts, and a rolling member cooperating with the cam member under the action of the resilient biassing means, the hinge mechanism defining a stable open position relative to which the two parts are able to effect limited and definable relative angular displacements against the action of the said resilient biassing means, wherein the resilient biassing means include a pair of flexion springs acting on opposite sides of the rolling member and defining the seat for laterally containing centering the rolling member.

6. Frame as defined in claim 5, wherein the two flexion springs are disposed in a Y-configuration the stem of which is anchored to the respective part of the frame and the arms of which opposite the stem open towards the said cam member and form a pair of resilient divergent sprung arms.

7. Frame as defined in claim 5 or claim 6, wherein the two flexion springs are formed by two separate pieces each of which has a root portion mating with the root portion of the other piece and a spring arm inclined at an obtuse angle to the root portion.

8. Frame as defined in claim 5 or claim 6, wherein the two flexion springs are formed by a single folded piece.

9. Spectacle frame having two parts interconnected so as to be pivotable relative to each other between a mutually closed folded position and a mutually open position, a resilient hinge mechanism pivotally interconnecting the parts and including resilient biassing means associated with one of the frame parts, a cam member associated with the other of the frame parts, and a rolling member cooperating with the cam member under the action of the resilient biassing means, the hinge mechanism defining a stable open position relative to which the two parts are able to effect limited and definable relative angular displacements against the action of the said resilient biassing means, wherein the resilient biassing means include an array of flexion springs on a substantially conical surface defining a seat for laterally containing and centering the rolling member.

10. Frame as defined in claim 2, wherein adjusting means are provided for varying the loading of said at least one spring arm of the flexion spring device.

11. Frame as defined in claim 10, whreein said at least one spring arm of the flexion spring device is slidably supported by the respective part of the frame and wherein the adjusting means include an adjusting screw for varying the projection of the at least one leaf spring spring arm with respect to the said part and a stop member for locking the flexion spring device in the adjusted position.

12. Frame as defined in claim 10, wherein the adjusting means act so as to vary the thrust exerted by the flexion spring device against the rolling member.

13. Frame as defined in claim 1, wherein the rolling member is selected from a cylindrical roller, a spherical member, an ovaloidal barrel roller, and an ellipsoidal roller.

14. Frame as defined in claim 1, and further including stop means for limiting the angular displacement of further opening of the two parts of the frame from the said stable open position.

15. Frame according to claim 1, including a front and two side pieces hinged to the sides of the front in correspondence with laterally projecting parts thereof, wherein the parts of the frame connected by the resilient hinge mechanism comprise the side pieces and the respective laterally projecting parts of the front.

16. Frame as defined in claim 15, wherein the flexion spring device is carried by each of the side pieces and wherein each of the side pieces has a lateral blade appendage which cooperates with a stop surface of the front to limit the angular displacement of further opening of the side piece from the said stable open position.

17. Frame as defined in claim 16, wherein the stop surface is constituted by the outer side of the cam member.

18. Frame as defined in claim 16, wherein each stop surface is defined by a recess formed in the side of the cam member in the body thereof.

19. Frame as defined in claim 16, wherein the stop surfaces are defined by recesses formed directly in the respective laterally projecting parts of the front with which the respective side pieces cooperate.

20. Frame as defined in claim 15, wherein each side piece has a box for housing the flexion spring device shaped with stop parts for limiting the resilient deformation of the flexion spring device in the sense of further angular opening movement of the side piece from the said stable open position.

21. Frame as defined in claim 15, wherein each side piece has a central reinforcement core with which the flexion spring device is aligned.

22. Frame as defined in claim 15, wherein each side piece has a centrl reinforcement core and wherein the flexion spring device is offset laterally with respect to this core.

23. Frame as defined in claim 1, having a front formed by two lens holders interconnected by a foldable bridge, wherein the two parts of the frame interconnected by the resilient hinge mechanism are constituted by the foldable portions of the bridge.

24. Frame as defined in claim 1, wherein each of the side pieces includes an initial portion connected to the front and a terminal portion which can be folded relative to the initial portion, wherein the two parts of the frame interconnected by means of the resilient hinge mechanism are constituted by the said initial and terminal portions of each side piece.

25. Frame as defined in claim 1, wherein the flexion spring device, the rolling member and the cam member are of metal.

26. Spectacle frame having two parts interconnected so as to be pivotable relative to each other between a mutually closed folded position and a mutually open position, a resilient hinge mechanism pivotally interconnecting the parts and including resilient biassing means associated with one of the frame parts, a cam member associated with the other of the frame parts, and a rolling member cooperating with the cam member under the action of the resilient biassing means, the hinge mechanism defining a stable open position relative to which the two parts are able to effect limited and definable relative angular displacements against the action of the said resilient biassing means wherein the resilient biassing means include a flexion spring device anchored to the respective part of the frame and defining a seat for the lateral containment and centering of the rolling member, the flexion spring device including at least one pair of substantially rigid blades rendered resilient by means of additional resilient support or bearing elements.

* * * * *

UNITED STATES PATENT AND TRADEMARK OFFICE
CERTIFICATE OF CORRECTION

PATENT NO. : 4,605,293

DATED : August 12, 1986

INVENTOR(S) : Oreste Blumenthal

It is certified that error appears in the above-identified patent and that said Letters Patent is hereby corrected as shown below:

On the title page insert

--(73) Assignee: Giuseppe Ratti Industria Ottica
S.p.A., Turin, Italy --.

Signed and Sealed this

Third Day of March, 1987

Attest:

DONALD J. QUIGG

Attesting Officer

Commissioner of Patents and Trademarks